No. 722,842. PATENTED MAR. 17, 1903.
W. C. HOOKER.
MOUSE TRAP.
APPLICATION FILED DEC. 8, 1902.

NO MODEL.

Witnesses
E. F. Stewart
G. A. Elmore

W. C. Hooker, Inventor;
by C. A. Snow & Co
Attorneys

UNITED STATES PATENT OFFICE.

WILLIAM CHAUNCEY HOOKER, OF ABINGDON, ILLINOIS.

MOUSE-TRAP.

SPECIFICATION forming part of Letters Patent No. 722,842, dated March 17, 1903.

Application filed December 8, 1902. Serial No. 134,391. (No model.)

*To all whom it may concern:*

Be it known that I, WILLIAM CHAUNCEY HOOKER, a citizen of the United States, residing at Abingdon, in the county of Knox and State of Illinois, have invented a new and useful Mouse-Trap, of which the following is a specification.

My invention relates to animal-traps, and particularly to traps for catching mice, rats, or the like, and has for its objects to produce a device of this character which will be simple of construction, inexpensive to manufacture, and will be extremely sensitive to the contact of the animal, thus insuring its efficiency of operation.

To these ends the invention comprises the combination, with a platform having an orifice formed therethrough, of a spring-actuated jaw and a trigger pivoted to the top of the platform extending through the orifice therein to the bottom of the platform and adapted to be operated by pressure on the platform.

The invention further comprises the details of construction and combination of parts more fully hereinafter described.

Figure 1:
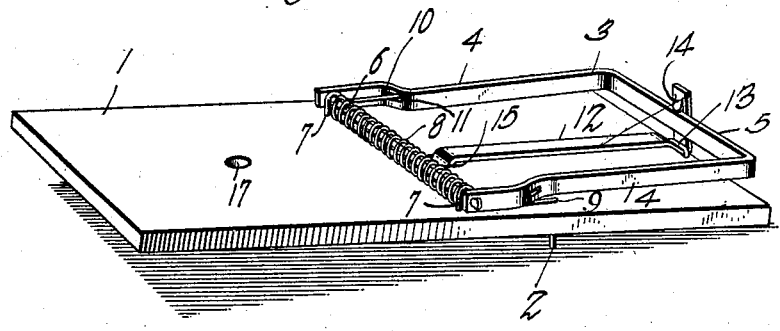
Figure 2:
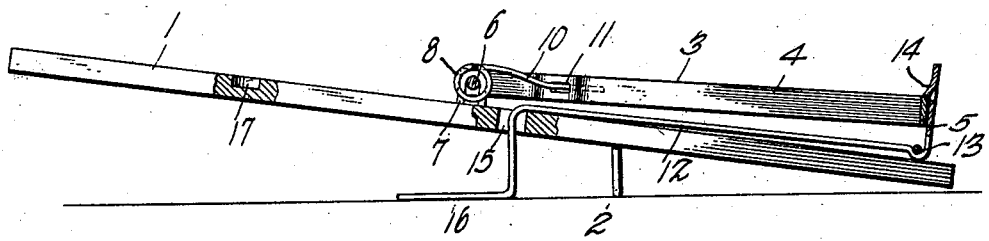
Figure 3:
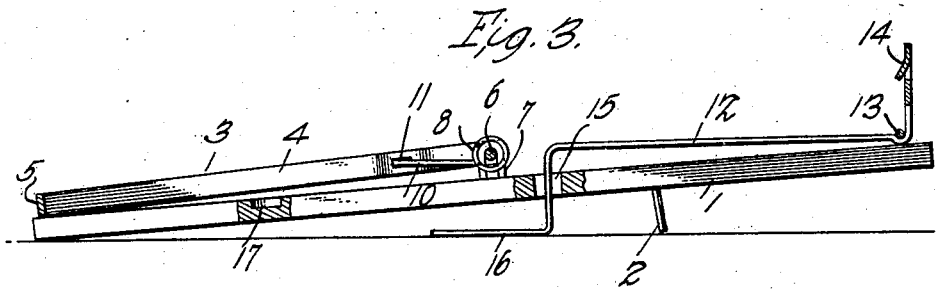

In the accompanying drawings, Figure 1 is a perspective view of the device set. Fig. 2 is a central longitudinal section through the same. Fig. 3 is a similar view of the trap sprung.

Referring to the drawings, 1 indicates the platform, composed of any suitable material, but preferably of wood.

2 is the means for supporting the platform distant from the floor, said means being preferably in the form of two vertical downwardly-depending pins situated one near each of the transverse edges of the platform and between its center and rear or trigger end, thus serving as a fulcrum on which the platform may rock.

3 is a spring-actuated jaw or fly pivoted to the top of the platform and adapted to swing to and fro longitudinally of the same in the manner and for the purpose to be presently explained. This jaw comprises a single piece or strip of metal bent into substantially U form, having sides 4 and an end 5, and so mounted that its sharp edge will contact with the platform.

6 is a metal rod, preferably wire, mounted in bearings 7 upon the upper face of the platform at or near its longitudinal center. This rod connects the sides 4 of the jaw near its open end and serves as a pivot on which the same swings, the rod being suitably headed at its ends to prevent escape of the jaw.

8 is a torsion-spring mounted on the rod 6 with one of its ends 9 bearing on the platform and its other end 10 engaging an orifice 11, formed in one side of the jaw. This spring is placed under tension and applies force to the jaw in the usual and well-known manner.

12 is the trigger, pivoted at its rear end to the platform, preferably by means of a staple 13, and having said end bent vertically upward and provided with a catch 14. The trigger extends longitudinally rearward of the platform, passes through an orifice 15, formed therethrough, to the bottom of the platform, where its free end is bent to form a pedal 16.

17 is a recess formed in the upper face of the platform and adapted to receive the bait.

In operation when the trap is set, as in Figs. 1 and 2, the jaw will be turned upon its pivot to its open position, the catch 14 serving to hold the same against the action of spring 8, which tends to forcibly close the jaw. In this position of the parts the feet 2 will sustain the bulk of the weight of the platform; but the pedal 16 of the trigger will sustain sufficient weight to render it extremely sensitive, so that the slightest weight or pressure on the forward end of the platform will swing the same on its fulcrum and operate the trigger, causing the catch to release the jaw, when the spring will instantly and forcibly return the same to closed position, as in Fig. 3.

It is to be understood that I do not limit myself to the precise details herein shown and described, as various changes may be made therein without departing from the spirit of my invention.

Having thus described my invention, what I claim is—

1. The combination with a platform, having an orifice formed therethrough, of a spring-actuated jaw, and a trigger pivoted to the top of the platform, extending through the orifice therein to the bottom of the platform and adapted to be operated by pressure on the platform.

2. The combination with a platform, having an orifice formed therethrough, of means for sustaining the platform distant from the floor, a spring-actuated jaw, and a trigger pivoted at one end to the top of the platform extending through the orifice therein and adapted to be operated by pressure on the platform.

In testimony that I claim the foregoing as my own I have hereto affixed my signature in the presence of two witnesses.

WILLIAM CHAUNCEY HOOKER.

Witnesses:
W. A. DETRICK,
F. P. TYLER.